(12) United States Patent
Umezurike (10) Patent No.: US 12,363,112 B2
(45) Date of Patent: Jul. 15, 2025

(54) REAL-TIME ANALYSIS PLUGIN FOR CYBER DEFENSE

(71) Applicant: Josiah Umezurike, Columbia, SC (US)

(72) Inventor: Josiah Umezurike, Columbia, SC (US)

( * ) Notice: Subject to any disclaimer, the term of this patent is extended or adjusted under 35 U.S.C. 154(b) by 195 days.

(21) Appl. No.: 18/194,706

(22) Filed: Apr. 3, 2023

(65) Prior Publication Data
US 2023/0254308 A1 Aug. 10, 2023

Related U.S. Application Data

(63) Continuation-in-part of application No. 16/697,157, filed on Nov. 26, 2019, now Pat. No. 11,367,065, which is a continuation of application No. 16/393,956, filed on Apr. 24, 2019, now Pat. No. 10,999,276, which is a continuation of application No. 15/875,378, filed on Jan. 19, 2018, now Pat. No. 10,911,217, and a continuation of application No. 13/364,339, filed on Feb. 2, 2012, now abandoned.

(51) Int. Cl.
*H04L 9/40* (2022.01)
(52) U.S. Cl.
CPC ...... *H04L 63/0876* (2013.01); *H04L 63/0823* (2013.01); *H04L 63/0861* (2013.01); *H04L 63/102* (2013.01)
(58) Field of Classification Search
CPC .......... H04L 63/0435; H04L 63/0876; H04L 63/166
See application file for complete search history.

(56) References Cited

U.S. PATENT DOCUMENTS

| | | | |
|---|---|---|---|
| 7,995,748 B2 | 8/2011 | Thaker et al. | |
| 8,107,629 B2 * | 1/2012 | Ryu | H04L 63/123 |
| | | | 455/410 |
| 8,332,947 B1 * | 12/2012 | Bregman | H04L 63/1433 |
| | | | 726/25 |
| 8,335,966 B1 | 12/2012 | Lary et al. | |
| 8,379,848 B2 | 2/2013 | Muise et al. | |
| 8,418,235 B2 | 4/2013 | Sherkin et al. | |
| 8,428,555 B2 * | 4/2013 | Kim | H04M 7/0078 |
| | | | 455/452.2 |
| 8,800,003 B2 | 8/2014 | Guo et al. | |

(Continued)

OTHER PUBLICATIONS

Josiah J_ Umezuricke et al., LokChainTM WhitePaper, Interconnection of the future Mobile, Blockchain and IoT. Nov. 30, 2018.

(Continued)

*Primary Examiner* — Viral S Lakhia
(74) *Attorney, Agent, or Firm* — GIBRALTAR CONSULTING LLC; Tariq S. Najee-Ullah (57) ABSTRACT

A solution to the problems caused by malicious attacks directed at web sites is provided. A system includes a processor of a security server node connected to at least one web server node over a network and a memory on which are stored machine-readable instructions that when executed by the processor, cause the processor to execute a universal security module (USM) configured to: monitor behavior of users visiting web sites provided by the web server node; and perform real-time analysis of the monitored behavior to execute an Identity Access Control and Access List Management.

14 Claims, 7 Drawing Sheets

(56) References Cited

U.S. PATENT DOCUMENTS

| | | | |
|---|---|---|---|
| 8,966,609 B2 | 2/2015 | Lee et al. | |
| 9,177,293 B1* | 11/2015 | Gagnon | H04L 51/212 |
| 9,198,033 B2* | 11/2015 | Buddhikot | H04L 9/321 |
| 9,479,503 B2 | 10/2016 | Griffin et al. | |
| 9,503,452 B1 | 11/2016 | Kumar et al. | |
| 9,536,107 B2 | 1/2017 | Soman et al. | |
| 10,103,878 B1 | 10/2018 | Sharifi Mehr | |
| 10,164,779 B2 | 12/2018 | Uhr et al. | |
| 10,277,630 B2* | 4/2019 | Fang | H04L 63/08 |
| 10,348,484 B2 | 7/2019 | King | |
| 10,397,780 B2 | 8/2019 | Rolfe | |
| 10,432,618 B1 | 10/2019 | Poder et al. | |
| 10,601,585 B1 | 3/2020 | Robinson et al. | |
| 10,749,681 B2 | 8/2020 | Andrade | |
| 10,756,883 B2 | 8/2020 | Brehmer et al. | |
| 10,902,140 B2 | 1/2021 | Bhatnagar et al. | |
| 10,911,217 B1 | 2/2021 | Umezurike | |
| 10,956,614 B2 | 3/2021 | Daniel et al. | |
| 10,972,280 B2 | 4/2021 | Allen et al. | |
| 10,999,276 B2 | 5/2021 | Umezurike | |
| 11,025,610 B2 | 6/2021 | Dasika Venkata Devi et al. | |
| 11,032,293 B2 | 6/2021 | Biyani et al. | |
| 11,057,366 B2 | 7/2021 | Avetisov et al. | |
| 11,102,008 B2 | 8/2021 | Maher | |
| 11,271,908 B2 | 3/2022 | Soundararajan et al. | |
| 11,438,338 B2 | 9/2022 | Gulbrandsen | |
| 11,497,557 B2 | 11/2022 | Haslam et al. | |
| 11,866,007 B2 | 1/2024 | Hassani | |
| 2007/0016804 A1 | 1/2007 | Kemshall | |
| 2008/0279367 A1 | 11/2008 | Thaker et al. | |
| 2010/0189316 A1 | 7/2010 | Walch | |
| 2011/0265149 A1* | 10/2011 | Ganesan | H04L 9/3215 |
| | | | 726/4 |
| 2011/0283174 A1* | 11/2011 | M'Raihi | H04L 61/4511 |
| | | | 715/205 |
| 2012/0124651 A1* | 5/2012 | Ganesan | H04L 63/18 |
| | | | 726/4 |
| 2015/0229613 A1 | 8/2015 | Baum et al. | |
| 2017/0109744 A1 | 4/2017 | Wilkins et al. | |
| 2017/0126577 A1 | 5/2017 | Sender et al. | |
| 2017/0187807 A1 | 6/2017 | Clernon | |
| 2017/0206532 A1 | 7/2017 | Choi | |
| 2017/0317833 A1 | 11/2017 | Smith et al. | |
| 2017/0339141 A1 | 11/2017 | Doyle | |
| 2017/0373853 A1 | 12/2017 | Soman | |
| 2018/0013567 A1 | 1/2018 | Davis | |
| 2018/0060860 A1 | 3/2018 | Tian et al. | |
| 2018/0089041 A1 | 3/2018 | Smith et al. | |
| 2018/0115413 A1 | 4/2018 | King | |
| 2018/0139601 A1 | 5/2018 | Dowlatkhah et al. | |
| 2018/0176017 A1 | 6/2018 | Rodriguez et al. | |
| 2018/0212970 A1 | 7/2018 | Chen et al. | |
| 2018/0225466 A1 | 8/2018 | Ducatel et al. | |
| 2018/0225469 A1 | 8/2018 | Daniel et al. | |
| 2019/0158653 A1 | 5/2019 | Sonntag | |
| 2019/0199521 A1 | 6/2019 | Sayers et al. | |
| 2019/0228407 A1 | 7/2019 | Wu | |
| 2019/0319808 A1 | 10/2019 | Fallah et al. | |
| 2020/0026834 A1 | 1/2020 | Vimadalal et al. | |

OTHER PUBLICATIONS

Non-Final Office Action dated Feb. 5, 2020 issued in U.S. Appl. No. 15/875,378.

Non-Final Office Action dated Nov. 28, 2016 issued in U.S. Appl. No. 13/364,339.

Notice of Allowance dated Jan. 26, 2021 issued in U.S. Appl. No. 16/393,956.

Notice of Allowance dated Oct. 15, 2020 issued in U.S. Appl. No. 15/875,378.

Notice of Allowance dated Oct. 27, 2021 issued in U.S. Appl. No. 16/697,157.

Notice of Allowance dated Apr. 2, 2025 issued in U.S. Appl. No. 18/194,706.

Notice of Allowance dated Feb. 18, 2025 issued in U.S. Appl. No. 18/193,538.

* cited by examiner

FIG. 5

REAL-TIME ANALYSIS PLUGIN FOR CYBER DEFENSE

RELATED APPLICATIONS

This application is a Continuation-In-Part of U.S. application Ser. No. 16/697,157 filed Nov. 26, 2019, which issued on Jun. 21, 2022 as U.S. Pat. No. 11,367,065 titled "Distributed Ledger System for Electronic Transactions"; which is a continuation of U.S. application Ser. No. 16/393,956 filed on Apr. 24, 2019, which issued as U.S. Pat. No. 10,999,276 titled "Industrial Internet Encryption System"; patent '065 is also a continuation of U.S. application Ser. No. 15/875,378 filed on Jan. 19, 2018, which issued as U.S. Pat. No. 10,911,217 titled "Endpoint-to-Endpoint Cryptographic System for Mobile and IoT Devices"; patent '276 is also claims priority to U.S. Non-Provisional application Ser. No. 13/364,339 filed Feb. 2, 2012, which are hereby incorporated by reference herein in its entirety.

TECHNICAL FIELD

This present disclosure generally relates to software development, and more particularly, to automated defense of web sites based on real-time analysis.

It is intended that each of the referenced applications may be applicable to the concepts and embodiments disclosed herein, even if such concepts and embodiments are disclosed in the referenced applications with different limitations and configurations and described using different examples and terminology.

BACKGROUND

Attack payloads including ransomware, malware and viruses remain problematic given a number of websites that need to be protected. The struggles for intrusion and anti-intrusion techniques relating to computer viruses have been ongoing. Various methods for reducing the intrusions of computer viruses have been developed, resulting in many corresponding protection products. These products can be generally classified into two categories. One group blocks invading viruses. For example, firewalls may reduce the intrusions of the viruses by restricting the communication ports, protocols, etc. The other group searches for virus-infected files that may allow for an intrusion.

For example, the present generation of antivirus software detects and removes the infected harmful files by scanning the code characteristics of the virus-infected files that may enable intrusions. Although the conventional products do, to a certain extent, fight virus intrusions, they unfortunately have a lot of shortcomings. For example, although firewalls may block the intrusions of some viruses or hackers, the principle subjects monitored by firewalls are ports and protocols, and the users have to set the rules of constraint by themselves. This technique may result is certain disadvantages. First, to set the rules effectively, the users have to be very familiar with the system. Second, because of the large amount of traffic to monitor, it is unlikely that rules will be set for the ports and protocols necessary for the network applications.

If unconstrained communications are allowed, intrusions by viruses or hackers may occur. If they are not allowed, the normal operation of the network may be affected. Antivirus software utilizing the characteristic codes of viruses always trails the development of the viruses. This is because it is only after virus samples are captured that the characteristic codes of viruses can be extracted. Therefore, this kind of antivirus software cannot prevent the intrusions of new unknown viruses, and even computers that have been installed with antivirus software still may be attacked by the viruses. This risk may be reduced by upgrading and updating the virus database which is always later than the occurrence of the viruses. The existing solution do not combine all cyber security tools into a holistic universal security solution.

Accordingly, a universal cyber defense system based on real-time analysis is desired.

SUMMARY

One embodiment provides a processor and memory of a security server node connected to at least one web server node over a network, wherein the processor is configured to execute a universal security module (USM) configured to: monitor behavior of users visiting web sites provided by the web server node; and perform real-time analysis of the monitored behavior to execute an Identity Access Control and Access List Management.

Another embodiment provides a method that includes one or more of executing a universal security module (USM) configured to: monitor behavior of users visiting web sites provided by the web server node; and perform real-time analysis of the monitored behavior to execute an Identity Access Control and Access List Management.

A further embodiment provides a non-transitory computer readable medium comprising instructions, that when read by a processor, cause the processor to perform one or more of executing a universal security module (USM) configured to: monitor behavior of users visiting web sites provided by the web server node; and perform real-time analysis of the monitored behavior to execute an Identity Access Control and Access List Management.

One or more embodiments including but not limited to any of the aforementioned embodiments provide for a Real-Time Analysis Plugin Cyber Defense (RAPCD).

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium, and system, as represented in the attached figures, is not intended to limit the scope of the present disclosure as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Disclosed embodiments provide methods, systems, components, non-transitory computer readable media, devices, and/or networks, which provide for smart profiling, real-time, holistic cybersecurity solution which allows organizations and security operation teams to remain agile and vigilant while protecting assets using layers of advanced authentication, server hardening, backup/restore procedures, monitoring and dashboard insights of attack payloads including ransomeware, malware and viruses. The disclosed embodiments provide solutions to the problems of cyber attacks including intrusions, viruses and malware. The proposed universal security module may provide the following:

1. Use of verifiable credentials within a protected environment;
2. Login without a password (Key less authentication: Personal token via push notifications, ccNFT and QR codes);
3. Host-Device Monitoring and application baseline analysis and analytics;
4. Ransomware Detection/Protection;
5. Generation of real-time snapshots of the Host-Device per time intervals (e.g., 5 seconds);
6. Device Recover, Restore and retaliate;
7. Autonomous Poly/Homomorphic Encryption of all data;
8. Management portal and dashboard for analytics and insight;
9. Build and capture an online profile and identify malicious actors;
10. Open Systems Interconnection Model (OSI) details of host and target encryption; and
11. IP addresses blacklisting, etc.

The proposed universal security module uniquely combines functionality of many security modules and provides a holistic cybersecurity solution. In one or more embodiments, solutions are provided to the problems of cyber attacks including intrusions, viruses and malware. In one or more instances, the proposed security solution may provide one or more of the following functions:

For incidents, auto isolation may be provided complete with prevention and incident response: The function may be initiated in the event the defense is broken. For example, if there is a security environment having the following elements: (i.e., a data dog monitor, Cloud Trail, and Guard duty for notification alerts through a pager duty system), then utilizing this system would provide for:

Incident log monitoring (NID or HID)

Alarms would be set off based on established access control rules.

Regarding the roles and attributes, the alarms would trigger notifications which could be sent via pagerduty, i.e. via email, text, etc.

In one or more instances, this may be sent to an auto capable executable file. This allows for scripts to run on a legacy operating system to use ECSMID to encrypt critical files (see U.S. Pat. No. 10,911,217 for ECSMID system).

The following functionality for monitoring and securing the system may be provided including but not limited to:
following encrypted path.
following decrypted path after recovery.
Encrypt machine path
Snapshot encrypted
Critical files encrypted In one or more instances, the following use cases are may be provided allowing the full functionality of this disclosure and system: robots (AI and artificial intelligence systems including systems controlled by varying capacities of AI and/or artificial intelligence including fully autonomous systems and semiautonomous systems); transportation (including autonomous vehicles, self-driving vehicles, cars, planes, trains, trucks, and all manner vehicles and transportation systems controlled by varying capacities of AI and/or artificial intelligence including fully autonomous systems and semiautonomous systems, manned and unmanned); utility companies (including SCADA systems, fully autonomous systems and semiautonomous systems, manned and unmanned); and IT Incident response (fully autonomous systems and semiautonomous systems, manned and unmanned); and other complex environments. As artificial intelligence grows in capabilities and capacity, there will be more and more need to provide secured environments.

In one embodiment, a cybersecurity solution may be implemented as a universal security module (USM) executed on a remote security server or as a BOT agent that is configured to perform an Identity Access and control of Access List Management (IACALM). The authentication part of the IACALM may be implemented in the backend. The USM may be implemented as an Agent (.wasm) or as an agentless web facing plugin. The USM may be include functionality associated with Bastion host or honey port.

In one embodiment, USM may be perform real-time analytics. The USM may listen to behaviors of web site visitors. The USM may analyze data stream(s), user key stroke pattern, user typing speed, interest and BOT-ness check. The USM may maintain a smart profile for each of the site visitors.

In one embodiment, the USM may determine website owners using online data for the business. A profile may be built based on submitted information such as a company name, contact person details, subdomains, etc. Registration and login may be established using the attributes of the profile and the established challenges for authentication. Login may be implemented as a passwordless operation or via a soft token.

The USM may verify, validate and evaluate the encrypted information to allow a default access and to grant the access when the advanced authentication conditions are met. In one embodiment, the USM may use number matching to ensure that what is requested by the user in terms of access will be exactly what is granted. The attributes submitted by both a corporation and its client are used to build a digital identity. All forms field are encrypted using keyless encryption protocol except for static fields used for support. The USM may employ the keyless encryption protocol disclosed in detail in the U.S. Pat. No. 10,911,217B1. As discussed above, access to the website resources is granted following advance authentication. In one embodiment, web assembly and a USM plugin-BOT are employed to accomplish autonomous encryption.

In one embodiment, the rogue applications and bad actors may be collated and shared based on comparison to other behaviors using AI/ML in the cloud of corroboration intelligence for profiles. This, advantageously, allows CISOs and SOC teams to analyze the cost of security incident in circumstance of a breach including a ransomware. They may carry a comparison of the required human resources to the cost. This will assist the stakeholders to mobilize resources accordingly in containment, eradication and recovery from the threat. The novel USM, advantageously, removes a need for encryption keys and passwords. In one embodiment, Autonomous Polymorphic/Homomorphic Encryption (APHE) may be used.

Figure 1:
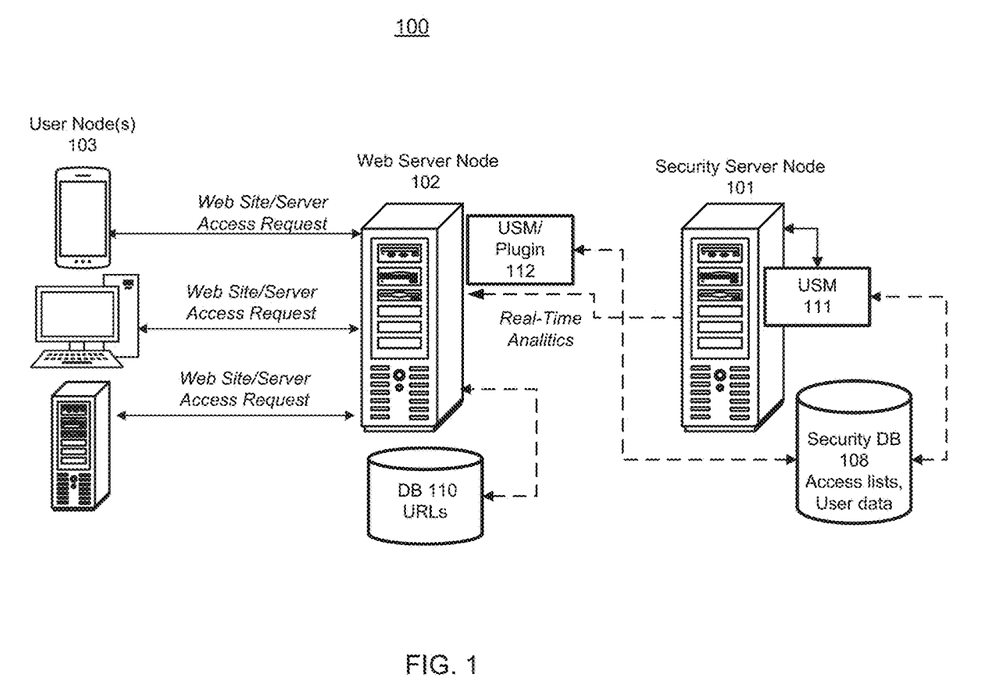
FIG. 1 illustrates a network diagram of a system 100 including a web server node and a security server node, according to disclosed embodiments.

FIG. 1 illustrates a network diagram of a system 100 including a web server node and a security server node, according to disclosed embodiments.

Referring to FIG. 1, a web server node 102 may be connected to a security server node 101 over a network. In one embodiment, the web server node 102 may be accessed by any of the user nodes 103 that request access to web sources over a network or wireless network connection. Both the web server node 102 and the security server node 101 may reside on a cloud. The web server node 102 may be connected to a database 110 that stores URLs and additional data.

In one embodiment, the security server node 101 may host a Universal Security Module (USM) 111. The USM 111 may be connected to a security database 108 that may store access lists and user data. The USM 111 may be activated on the security server node 101 to perform real-time analytics of the access to the web server node 102 by the user nodes 103. As discussed above, the USM 111 is configured to provide keyless encryption, Identity Access Control and Control of Access list management for the web server node 102. In one embodiment, the USM 111 may be downloaded to the web server node 102 to be used as USM/plugin 112.

The USM 111 or the USM/plugin 112 may listen to behaviors of web site visitors of the user nodes 103. The USM 111 or the USM/plugin 112 may analyze data stream (s), user key stroke pattern, user typing speed, etc. The USM 111 or the USM/plugin 112 may maintain a smart profile for each of the site visitors connected to the web server node 102. As discussed above, the access to the website resources on the web server node 102 may be granted following the advance authentication. The USM 111 or the USM/plugin 112 are employed to accomplish autonomous encryption.

Figure 2:
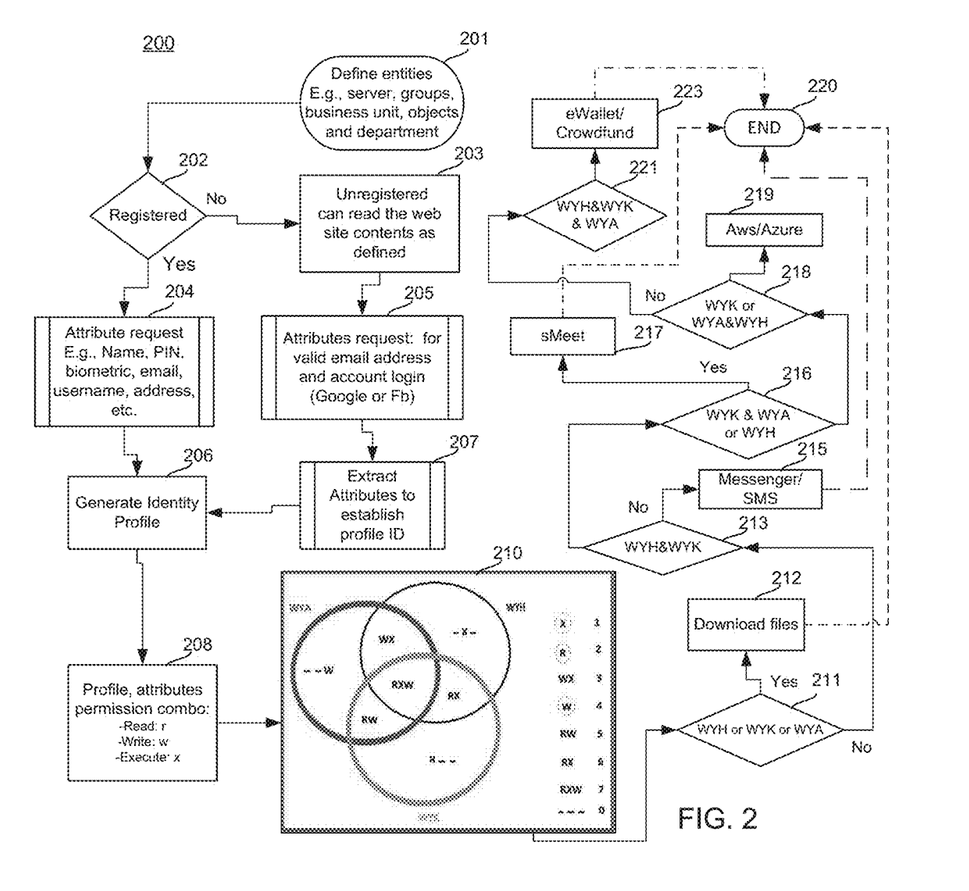
FIG. 2 illustrates a flowchart of Identity Access and Control of Access List management (IACALM) implemented by the USM or USM/plugin, according to the disclosed embodiments.

FIG. 2 illustrates a flowchart 200 of Identity Access and Control of Access List management (IACALM) implemented by the USM or USM/plugin, according to the disclosed embodiments.

At block 201, the USM may define entities such as server, groups, units, departments, etc. At block 202, the USM may check if a user is registered. At block 203, the user may be allowed to read the web site content as defined. At block 205, the USM may request for valid email address and account login (e.g., Google or Fb). At block 207, the USM may extract attributes to establish a profile ID. Then, at block 206, the identity profile is generated.

If, at block 202, the user is registered, the USM may request an attribute such as name, PIN, biometric sample, email, username, address, etc. The attributes are used to generate the identity profile at block 206. At block 208, the USM generates a profile and attributes permission combo such as read, write and execute. At block 210, the permission combo is used classified by what you know (WYK), what you have (WYH) and what you ask (WYA) data types. The WYA data may include: an electronic fingerprint, vein pattern, typing rhythm, signature recognition, gait recognition, mouse movement analysis, etc. The WYH data may include: registered party or company email, SS, DOB, address, full name or company name, FEIN, PP, IMEI/MAC/UID, mobile number, username, Soft/Hard token, driver license. The WYK data may include a password or MPIN.

Then, at block 211, the USM checks for the WYK or WYH or WYA data. If the data is available, the USM may download the files at block 212 and may end the process at block 220. If, at block 211, the data is not available, the USM may check at block 213 for the WYK and WYH data. If the data is not available, the USM send the message at block 215 and ends the process at block 220. The USM may check at block 216 for WYK or WYA or WYH data. If the data is available, the USM checks for WYK or WYA and WYH at block 218.

If the data is available, the USM may provide the data to MS Azure™. Otherwise, at block 221, the USM checks for WYK and WYH and WYA data. If the data is available, it may be used in eWallet or crowdfund applications at block 223 after which the process ends at block 220. If the data is not available at block 216, the data may be used in sMeet application at block 217 after which the process ends at block 220.

In one embodiment, the control portion of the USM may run separately in the backend following a request and response format. A pre-arranged access control may be used based on the attributes submitted by the user after login. Once the user is on the website, he may follow the advanced authentication to complete his tasks. For example, a user who logged in with only a username and password may not have the same privileges with another user who logged in with a username, password and PIN.

In one embodiment, based on the registration attributes supplied by a user, the user may have a set of privileges with permissions based on the profile attributes. This allows for efficient access control and access management. The user roles may be affected by the policies of the USM.

Figure 3:
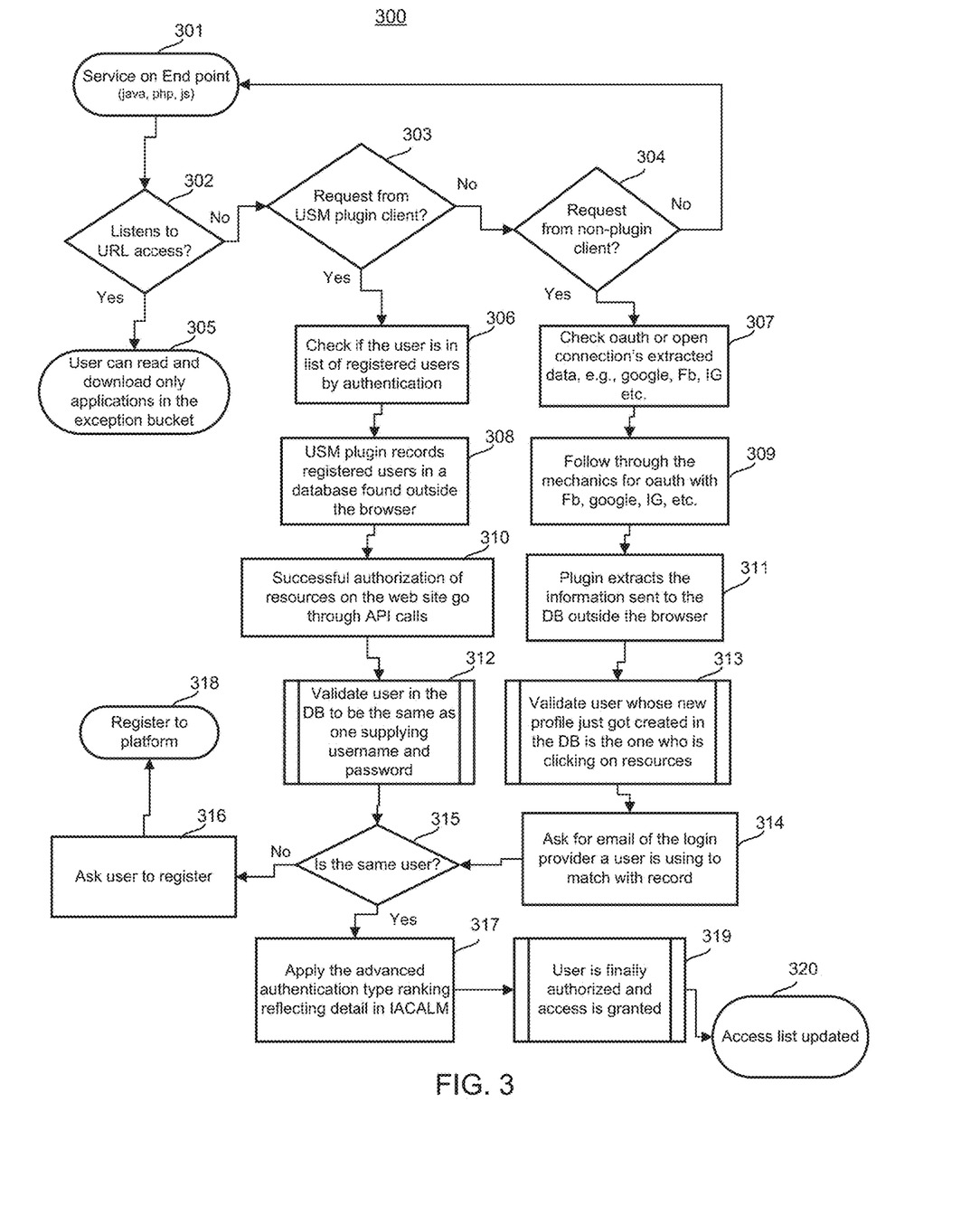
FIG. 3 illustrates a further diagram 300 of Access List Management, according to the disclosed embodiments.

FIG. 3 illustrates a further diagram 300 of Access List Management, according to the disclosed embodiments.

At block 301, the service on the end point is started. At block 302, the USM listens to the URL access. If the URL access is detected at block 302, the user may read and download only the applications that are in the exception bucket. If no URL access is detected at block 302, the USM checks, at block 303, if a request from a USM plugin client is received. If the request is received, the USM may check if the user is in a list of registered users by authentication, at block 306. At block 308, the USM plugin records registered users in a database found outside the browser. At block 310, the successful authorization of resources on the web site goes through API calls. At block 312, the USM plugin may validate user in the database to be the same as one supplying username and password. If at block 315, it is determined that the user is the same, the USM plugin may apply the advanced authentication type ranking reflecting detail in IACALM at block 317. Otherwise, at block 316, the user is asked to register. At block 318, the USM plugin may register the user to the platform.

If, at block 303, no request from the USM plugin client is detected, the USM checks if there is a request from a non-USM plugin client is present at block 304. If there is no request, the process moves to block 301 for process on End point. If the request is detected, the USM checks OAuth or open connection's extracted data (e.g., google, fb, IG, etc.). At block 309, the USM follows through the mechanics for OAuth with Fb, google, IG, etc. At block 311, the USM extracts the information sent to the database (DB) outside the browser.

At block 313, the USM may validate user whose new profile has just been created in the DB is the one who is clicking on resources. At block 314, the USM may ask for email of the login provider user is using to match with record. Then, if at block 315, it is determined that the user is the same, the USM plugin may apply the advanced authentication type ranking reflecting detail in IACALM at block 317. At block 319, the user is finally authorized and access is granted. The access list is update at block 320.

Figure 4:
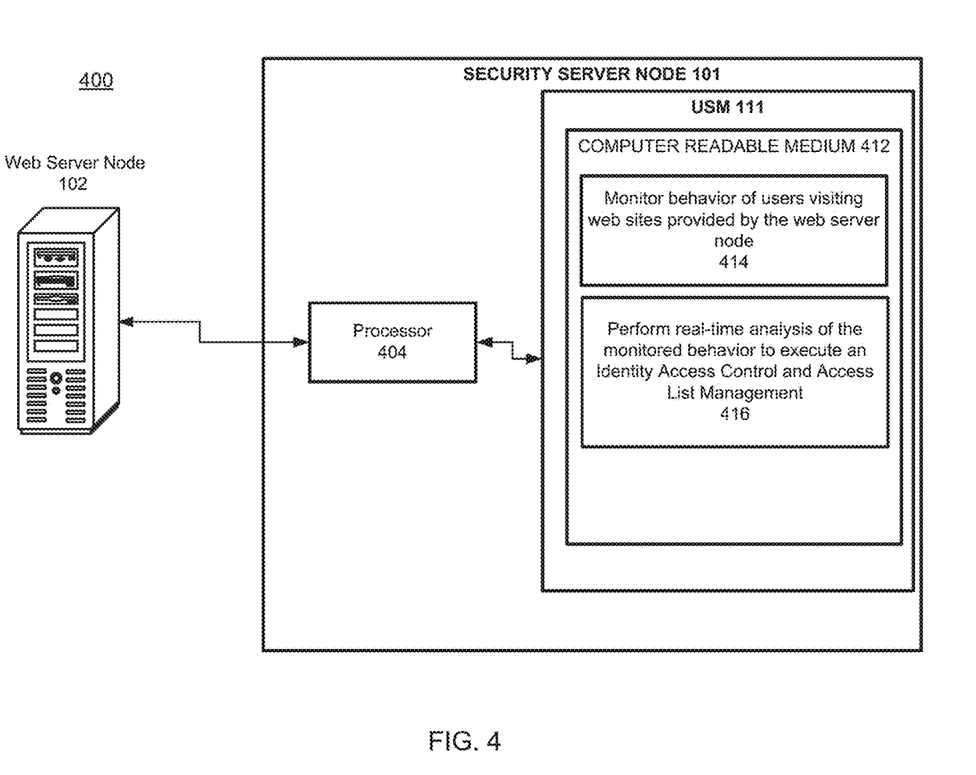
FIG. 4 illustrates an example network including details of the security server node, according to the disclosed embodiments.

FIG. 4 illustrates an example network including details of the security server node.

Referring to FIG. 4, the example network 400 includes the security server node 101 connected to web server node 102 over a network. The security server node 101 host the USM 111. As discussed above, the USM 111 may be activated on the security server node 101 to perform real-time analytics of the access to the web server node 102 by users. The USM 111 may be configured to provide keyless encryption, Identity Access Control and Control of Access list management for the web server node 102. The USM 111 may listen to behaviors of web site visitors. The USM 111 may analyze data stream(s), user key stroke pattern, user typing speed, etc. The USM 111 may maintain a smart profile for each of the site visitors connected to the web server node 102. As discussed above, the access to the website resources on the web server node 102 may be granted following the advance authentication. The USM 111 may provide autonomous encryption of the user data on the web server node 102.

The security server node 101 may be a computing device or a server computer, or the like, and may include a processor 404, which may be a semiconductor-based microprocessor, a central processing unit (CPU), an application-specific integrated circuit (ASIC), a field-programmable gate array (FPGA), and/or another hardware device. Although a single processor 404 is depicted, it should be understood that the security server node 101 may include multiple processors, multiple cores, or the like, without departing from the scope of the security server node 101 system.

The security server node 101 may also include a non-transitory computer readable medium 412 that may have stored thereon machine-readable instructions executable by the processor 404. The computer readable medium 412 may be encapsulated inside of the USM 111. Examples of the machine-readable instructions are shown as 414-416 and are further discussed below. Examples of the non-transitory computer readable medium 412 may include an electronic, magnetic, optical, or other physical storage device that contains or stores executable instructions. For example, the non-transitory computer readable medium 412 may be a Random Access memory (RAM), an Electrically Erasable Programmable Read-Only Memory (EEPROM), a hard disk, an optical disc, or other type of storage device.

The processor 404 may fetch, decode, and execute the machine-readable instructions 414 to execute a universal security module (USM) configured to monitor behavior of users visiting web sites provided by the web server node. The processor 404 may fetch, decode, and execute the machine-readable instructions 416 execute the universal security module (USM) configured to perform real-time analysis of the monitored behavior to execute an Identity Access Control and Access List Management.

Figure 4A:
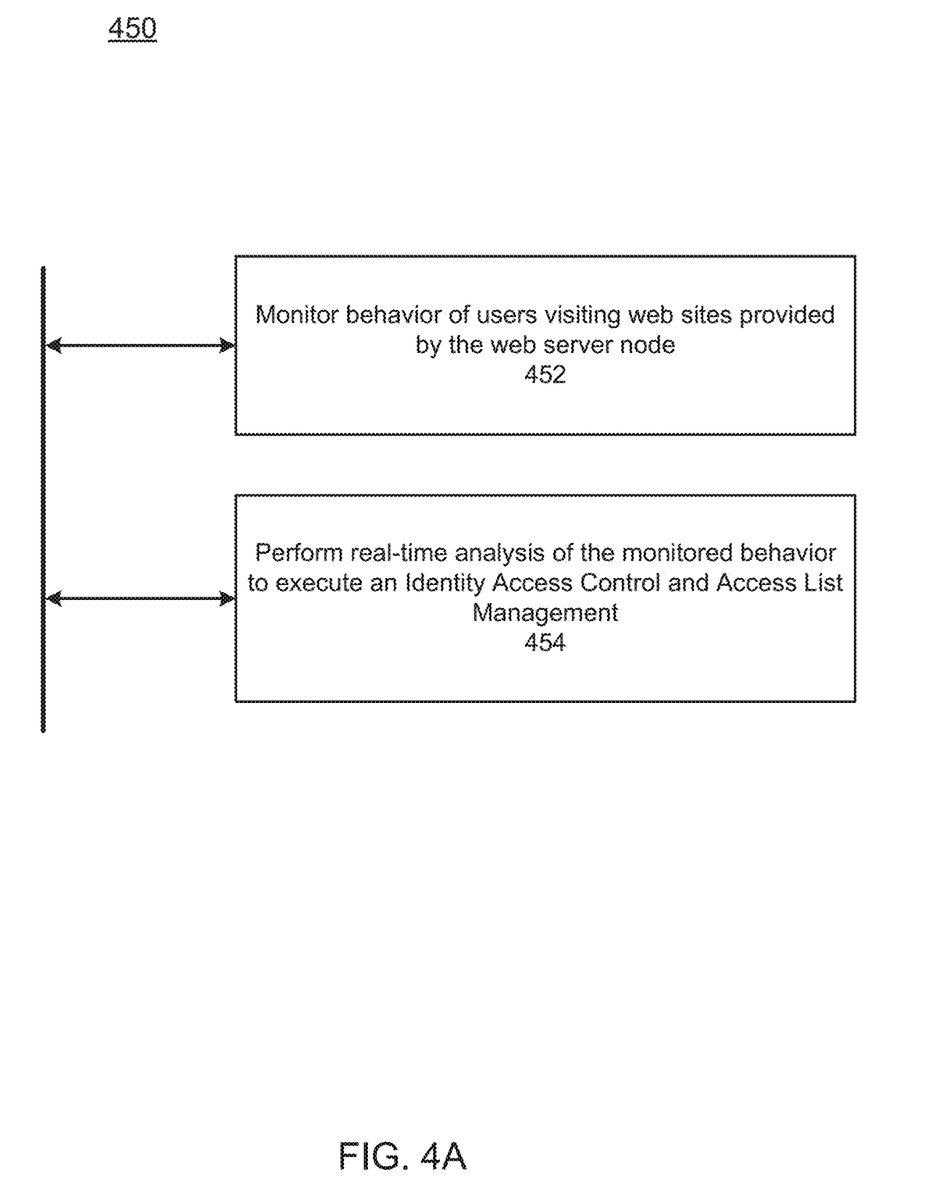
FIG. 4A illustrates a flow diagram 450 of an example method, according to disclosed embodiments.

FIG. 4A illustrates a flow diagram 450 of an example method, according to disclosed embodiments. FIG. 4A illustrates a flow chart of an example method executed by the security server node 101 (see FIG. 1). It should be understood that method 450 depicted in FIG. 4A may include additional operations and that some of the operations described therein may be removed and/or modified without departing from the scope of the method 450. The description of the method 450 is also made with reference to the features depicted in FIG. 4 for purposes of illustration. Particularly, the processor 404 of the security server node 101 may execute some or all of the operations included in the method 450.

Referring to FIG. 4A, the method 450 may also include one or more of the following steps. At block 452, the processor 404 may monitor behavior of users visiting web sites provided by the web server node. At block 454, the processor 404 may perform real-time analysis of the monitored behavior to execute an Identity Access Control and Access List Management.

Figure 4B:
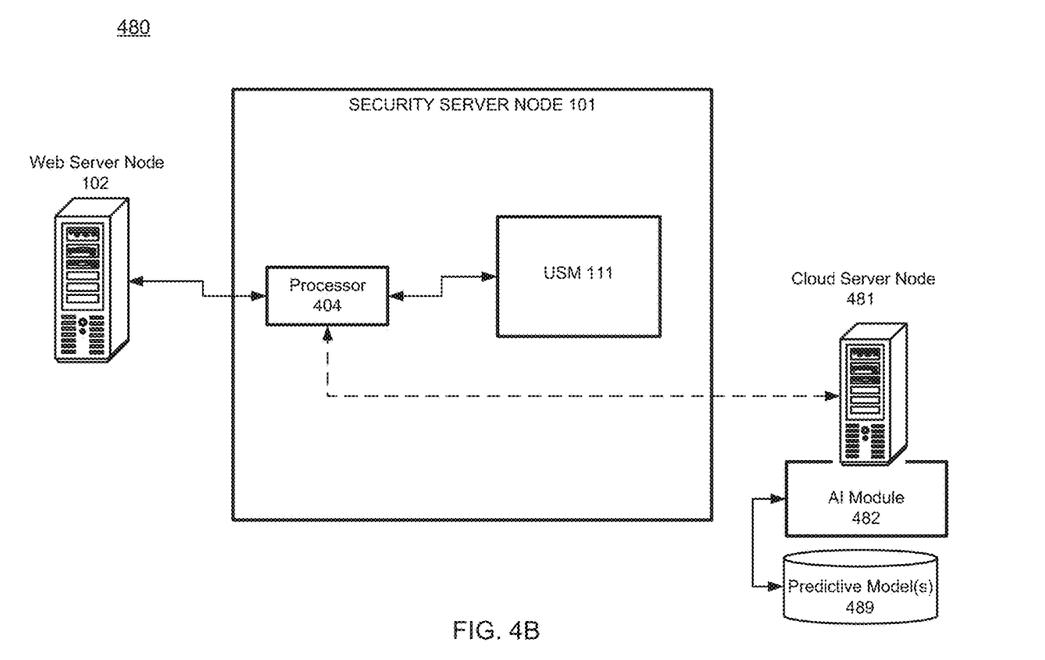
FIG. 4B illustrates a network used for web defense based on real-time analysis and predictive inputs, in accordance with embodiments of the present invention.

FIG. 4B illustrates a network 480 used for cyber defense based on real-time analysis and predictive inputs, in accordance with embodiments of the present invention.

As discussed above, the rogue applications and bad actors may be collated and shared based on comparison to heuristics data using AI/ML in the cloud of corroboration intelligence for profiles. Upon receiving the data from the web server node 102, the USM 111 that is running on the security server node 102 performs security-related data analytics to create a digital trust protocol which validates origin of all files and ensures that no intrusion is detected. The digital trust protocol may be obtained by using predictive data analytics from an AI module 482 that compares detected user behaviors to malicious activities. The AI module 428 may be executed on the security server node 101 or may reside on a cloud server node 481. The security server node 101 may use locally stored historical data for intrusion-related data analytics as well. The AI module 482 may generate predictive analytics model 489 which may process, for example, analytical data produced by the USM 111. The analytical data may be stored on a ledger of a blockchain as reliable audible log. While the AI module 482 may use data acquired form neural networks, it may also use some heuristics-related data stored on the ledger for predictive analytics.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system/server node 500, which may represent or be integrated in any of the above-described components, etc.

Figure 5:
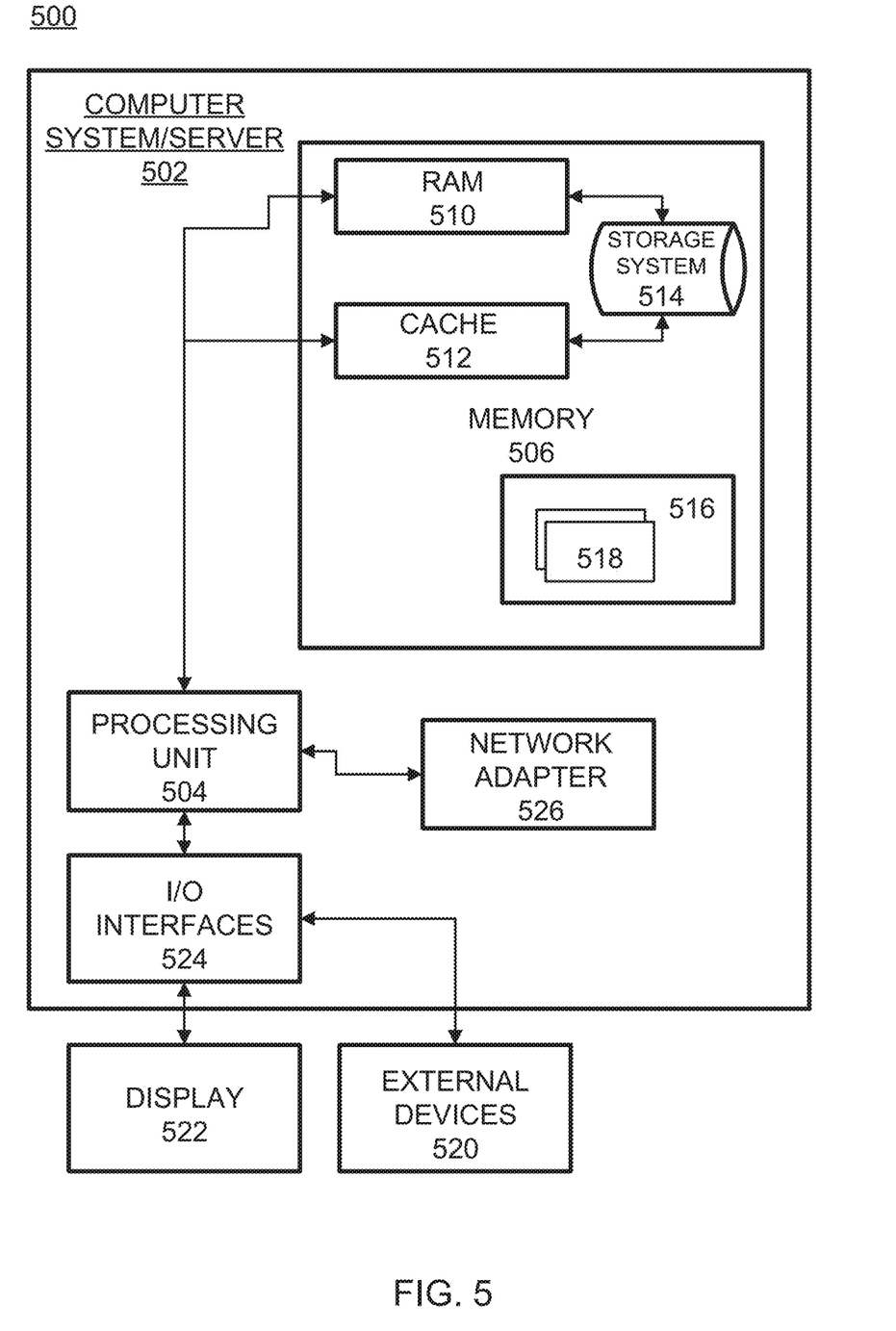
FIG. 5 illustrates an example computer system/server node, which may represent or be integrated in any of the components of the embodiments of the present invention.

FIG. 5 is not intended to suggest any limitation as to the scope of use or functionality of embodiments of the application described herein. Regardless, the computing node 500 is capable of being implemented and/or performing any of the functionality set forth hereinabove.

In the computing node 500 there is a computer system/server 502, which is operational with numerous other general purposes or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system/server 502 may be used in cloud computing node 900 shown in the form of a general-purpose computing device. The components of the computer system/server 502 may include, but are not limited to, one or more processors or processing units 504, a system memory 506, and a bus that couples various system components including system memory 506 to processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The exemplary computer system/server 502 typically includes a variety of computer system readable media. Such media may be any available media that is accessible by the computer system/server 502, and it includes both volatile and non-volatile media, removable and non-removable media. System memory 506, in one embodiment, implements the flow diagrams of the other figures. The system memory 506 can include computer system readable media in the form of volatile memory, such as random-access memory (RAM) 510 and/or cache memory 512. The computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 906 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

The computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, the computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 502. Examples include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, recipient or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a Smart phone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms, etc.) thereto.

What is claimed is:

1. A system, comprising:
   a processor of a security server node connected to at least one web server node over a network;
   a memory on which are stored machine-readable instructions that when executed by the processor, cause the processor to:
   execute a universal security module (USM) configured to:
   monitor behavior of users visiting web sites provided by the web server node;
   perform real-time analysis of the monitored behavior to execute an Identity Access Control and Access List Management;
   wherein the instructions further cause the processor to execute the USM to collect data submitted by the users visiting the web sites;
   wherein the instructions further cause the processor to execute the USM to generate a smart profile for each of the users visiting the web sites based on the collected data;
   and wherein the instructions further cause the processor to execute the USM to provide a passwordless login or perform a login via a soft token.

2. The system of claim 1, wherein the instructions further cause the processor to execute the USM to encrypt data entered by the users visiting the web sites using keyless encryption.

3. The system of claim 2, wherein the instructions further cause the processor to execute the USM to verify, validate and evaluate encrypted data.

4. The system of claim 1, wherein the instructions further cause the processor to execute the USM to extract attributes from the smart profile to establish authentication challenges.

5. The system of claim 1, wherein the instructions further cause the processor to execute the USM to allow a default access to the users visiting the web sites responsive to meeting of advanced authentication conditions.

6. The system of claim 1, wherein the USM is a plugin bot executing on the web server node.

7. The system of claim 1, wherein the USM is configured to receive predictive inputs from an AI module to detect malicious behavior of the users visiting the web sites.

8. A method, comprising:
executing, by a security server node, a universal security module (USM) configured to:
monitor behavior of users visiting web sites provided by a web server node;
perform real-time analysis of the monitored behavior to execute an Identity Access Control and Access List Management;
collecting data submitted by the users visiting the web sites;
generating a smart profile for each of the users visiting the web sites based on the collected data; and
providing a passwordless login or perform a login via a soft token.

9. The method of claim 8, further comprising encrypting data entered by the users visiting the web sites using keyless encryption.

10. The method of claim 9, further comprising verifying, validating and evaluating encrypted data.

11. The method of claim 8, further comprising, extracting attributes from the smart profile to establish authentication challenges.

12. The method of claim 8, further comprising allowing a default access to the users visiting the web sites responsive to meeting of advanced authentication conditions.

13. A non-transitory computer readable medium comprising instructions, that when read by a processor, cause the processor to perform:
executing, by a security server node, a universal security module (USM) configured to:
monitor behavior of users visiting web sites provided by a web server node;
perform real-time analysis of the monitored behavior to execute an Identity Access Control and Access List Management;
collect data submitted by the users visiting the web sites;
generate a smart profile for each of the users visiting the web sites based on the collected data; and
provide a passwordless login or perform a login via a soft token.

14. The non-transitory computer readable medium of claim 13, further comprising instructions, that when read by the processor, cause the processor to allow a default access to the users visiting the web sites responsive to meeting of advanced authentication conditions.

* * * * *